United States Patent [19]
Hosek et al.

[11] Patent Number: 5,934,424
[45] Date of Patent: Aug. 10, 1999

[54] CENTRIFUGAL DELAYED RESONATOR PENDULUM ABSORBER

[75] Inventors: Martin Hosek, Storrs, Conn.; Hakan Elmali, Maynard, Mass.; Nejat Olgac, Willimantic, Conn.

[73] Assignee: The University of Connecticut, Storrs, Conn.

[21] Appl. No.: 08/742,381

[22] Filed: Nov. 1, 1996

[51] Int. Cl.⁶ ..................................... F16F 7/00
[52] U.S. Cl. .......................... 188/379; 248/550; 248/562
[58] Field of Search ........................... 188/267, 378–380; 248/550, 562, 636; 267/140.14, 140.15

[56] References Cited

U.S. PATENT DOCUMENTS

| | | | |
|---|---|---|---|
| 989,958 | 4/1911 | Frahm . | |
| 3,306,399 | 2/1967 | Flannelly | 188/378 |
| 3,322,379 | 5/1967 | Flannelly | 188/378 |
| 3,445,080 | 5/1969 | Flannelly | 188/378 |
| 4,470,121 | 9/1984 | Ebert | 188/378 |
| 4,550,812 | 11/1985 | Mard | 188/379 |
| 5,072,801 | 12/1991 | Freyman et al. | 248/550 |
| 5,293,974 | 3/1994 | Bieteuhader et al. | 188/379 |
| 5,431,261 | 7/1995 | Olgac . | |
| 5,456,341 | 10/1995 | Gavujost et al. | 188/378 |
| 5,505,282 | 4/1996 | Olgac . | |

FOREIGN PATENT DOCUMENTS

| | | |
|---|---|---|
| 21139 | 9/1911 | United Kingdom . |
| 337466 | 11/1930 | United Kingdom . |

OTHER PUBLICATIONS

J.P. Den Hartog, "tuned Pendulums as Torsional Vibration Eliminators", Stephen Timoshenko 60th Anniversary vol., Macmillian, London, UK.

Olgac, N., Elmali, H., and Vijayan, S. 1995 "Introduction to Dual Frequency Fixed Delayed Resonator" Journal of Sound and Vibration vol. 189, p. 355, 1996.

Olgac, N., and Holm Hansen, B., 1994 "A Novel Active Vibration Absorpotion Technique; Delayed Resonator", Journal of SOund and Vibration vol., 176, p. 93.

Olgac, N., and Holm Hansen, B., 1996 "Tunable active Vibration Absorber: The Delayed Resonator" ASME JOurnal of Dynamic Systems, Measurement and Control, vol. 117, Dec. 1995.

Thomaon, W.T., 1988 Theory of Vibration with Applications:, Prentice Hall, Englewood Cliffs, NJ.

Primary Examiner—Matthew C. Graham
Assistant Examiner—Chris Schwartz
Attorney, Agent, or Firm—Pepe & Hazard

[57] ABSTRACT

Torsional vibrations in a rotating structure having a relatively large mass and subject to varying frequencies of torsional excitation are damped by determining the frequency of torsional excitation of the rotating structure and coupling to the rotating structure a damping pendulum of smaller mass to provide an absorber unit rotating therewith. The angular displacement of the damping pendulum relative to the rotating structure is continuously monitored, and the frequency of excitation is determined. The monitored displacement of the damping pendulum together with the mass damper characteristics of the absorber unit are processed to output a signal which produces a control torque on the damping pendulum proportional to the monitored displacement of the damping pendulum with a controlled time delay to produce control torque on the damping pendulum substantially equal to the torsional excitation of the rotating structure. This produces resonance of the damping pendulum substantially at the torsional excitation of the rotating structure which is effective to damp the vibrations of the rotating structure.

7 Claims, 10 Drawing Sheets

CENTRIFUGAL DELAYED RESONATOR PENDULUM ABSORBER

BACKGROUND OF THE INVENTION

The present invention relates to vibration dampers, and, more particularly, to damping of vibrations in rotating mechanical structures.

There are a great number of rotating mechanical structures such as engine-driven electrical generator systems, and crankshaft and transmission systems of aircraft, automotive and marine propulsion engines which are often subject to cyclical forces. These cyclical forces cause undesirable torsional oscillatory motions in the rotating structures, and two accepted ways of eliminating them are the coupling thereto of friction damping and vibration absorbing assemblies.

Friction dampers have been described by F. W. Lanchester in U. K. Patent No. 21,139 dated 1910, Den Hartog and J. P. Ormondroyd in "Torsional Vibration Dampers, Transactions of ASME, Vol. 52, p.13 (1930); W. K. Wilson in "Practical Solution of Torsional Vibration Problems", Champan and Hall Ltd., London, Great Britain (1968); and W. T. Thomson in "Theory of Vibration with Applications", Prentice Hall, Englewood Cliffs, N.J. (1988). Such a damper is an auxiliary device for dissipating energy in the form of heat by means of the frictional resistance between the primary structure (the rotating mechanical structure to be damped) and a supplemental mass. In general, its effectiveness is lower than that of comparable dynamic absorbers.

Conventional torsional absorbers are described by H. Frahm in U.S. Pat. No. 989,958 granted in 1911, J. Ormondroyd and J. P. Den Hartog in "The Theory of the Dynamic Vibration Absorber", Transactions of ASME, Vol. 50, p.2 (1928); W. K. Wilson, supra; and Thomson, supra. Such an absorber is an auxiliary vibratory system which modifies the vibration characteristics of the primary structure by providing a supplemental mass which is elastically connected to the primary structure by a metallic or a rubber spring assembly. Since the natural frequency of the absorber is constant, it can be effective only when the disturbance frequency coincides with the frequency to which the assembly is tuned. Furthermore, when the conventional absorber is used to deal with a given resonant condition, its effect is to replace the troublesome resonant peak by two new resonant conditions, one below and the other above the original resonant peak.

Centrifugal pendulum absorbers have been described by B. C. Carter in U. K. Patent No. 337,466 in 1929, J. P. Den Hartog in "Tuned Pendulums as Torsional Vibration Eliminators", Stephen Timoshenko 60th Anniversary volume, Macmillan, London, Great Britain (1938); W. K. Wilson, supra; and W. T. Thomson, supra. These also use an auxiliary vibratory arrangement having dynamic behavior which is controlled by a centrifugal acceleration field. The natural frequency of the centrifugal pendulum absorber is directly proportional to the angular velocity of the primary structure and the proportionality constant is fixed as a property of the particular design. Therefore, in order to maintain the highest possible absorption efficiency against the disturbance frequencies, the ratio between the disturbance frequency and the angular velocity of the primary structure should remain constant.

All of these passive vibration suppression devices fail to function effectively when the frequency of the disturbance varies freely in time. However, a series of active vibration absorption systems have been presented in the literature by Y. Furuishi and J. Taketou in "Vibration Control of Structure by Active Mass Damper", Transactions of JSME, Vol. 52, No. 474c, p. 683 (1986); Yoshida et al. 1988, K. Seto and Y. Furuishi in "A Study on Active Dynamic Absorber", Proceedings of ASME, Modal Analysis, Modeling, Diagnostics and Control. DE-38, p. 263 (1991); H. Nagato and Y. Yoshida in "Control of Active Dynamic Vibration Absorber by Neural Network", Transactions of JSME, Vol. 58, No. 550, p. 1755 (1992).

The concept of a delayed resonator (DR) has been recently described by N. Olgac and B. Holm-Hansen in "A Novel Active Vibration Absorption Technique: Delayed Resonator", Journal of Sound and Vibration, Vol 176, p. 93 (1994); N. Olgac in U.S. Pat. No. 5,431,261 granted Jul. 11, 1995, and N. olgac in U.S. Pat. No. 5,505,282 dated Apr. 9, 1996. In such a device, a simple position feedback is used with a time delay to tune the absorber to have it "sensitive" to a given frequency. Utilizing this control, a conventional absorber setting is forced to mimic an ideal resonator. The DR absorber can remove the primary oscillations completely within a certain range around the natural frequency of the mass-spring-damper setting used. However, although its principles are effective to deal with vibrations of a translational character, it is not effective in dealing with torsional vibrations in which the frequency of disturbance varies with the angular velocity of the primary structure such as in the crankshaft and transmission system of aircraft, automotive and marine propulsion engines.

It is an object of the present invention to provide a novel absorber for damping the vibrations of varying frequency in a rotating structure.

It is also an object to provide such an absorber which may be readily coupled to various rotating structures to dynamically damp varying frequencies of vibration.

Another object is to provide a novel vibration damping assembly which will damp both vibrations resulting from variations in rotational torque and vibrations of a translational nature.

A further object is to provide a novel method for damping the vibrations in a rotating structure resulting from external disturbance torques.

Yet another object is to provide a novel method for damping both vibrations of a translational nature and those resulting from rotational torque.

SUMMARY OF THE INVENTION

It has now been found that the foregoing and related objects may be readily attained in a method for damping torsional vibrations in a rotating structure having a relatively large mass and subject to varying frequencies of torsional excitation.

First, the method involves the determination of the frequency of torsional excitation of a rotating structure of relatively large mass in which the vibrations caused by the frequency are to be damped to the rotating structure. A damping pendulum of smaller mass is coupled to provide an absorber unit rotating with the rotating structure. The damper characteristics for the absorber at the determined frequency of excitation are determined and the angular displacement of the damping pendulum relative to the rotating structure is continuously monitored.

The monitored displacement of the damping pendulum is processed together with the mass damper characteristics of the absorber unit, and a signal is output to produce a control torque on the damping pendulum which is proportional to the monitored displacement of the damping pendulum and has a controlled time delay to produce a control torque on the damping pendulum. This is substantially equal to the torsional excitation of the rotating structure and produces resonance of the damping pendulum substantially at the torsional excitation of the rotating structure. This resonance is effective to damp substantially the vibrations of the rotating structure, and the output signal is variable to produce a controlled torque on the damping pendulum with a delay and which is proportional to the displacement of the damping pendulum.

In one embodiment, the signal effects the rotation of a motor in the absorber unit to produce a control torque on its pendulum mass.

Desirably, the method uses at least two absorber units which are coupled to the rotating structure and receive torsional excitations to cooperatively damp the torsional vibrations in the rotating structure.

Generally, the processing step utilizes the following formula to obtain the feedback signal:

$$g\theta_a(t-\tau)$$

wherein g is gain, $\theta_a$ is the monitored displacement and $\tau$ is the feedback delay The feedback delay ($\tau$) and gain (g) are determined as follows:

$$g_c = \sqrt{(c_a\omega_c)^2 + [(I_a + m_a R_a^2)\omega_c^2 - m_a R_1 R_a \omega_0^2]^2}$$

$$\tau_c = \frac{a\tan2[c_a\omega_{c'}(I_a + m_a R_a^2)\omega_c^2 - m_a R_1 R_a \omega_0^2] + 2(l-1)\pi}{\omega_c},$$

$$l = 1, 2, 3 \ldots$$

wherein $\tau_c$ is the feedback delay and $g_c$ is the gain. The deviation of these formulae is described hereinafter.

The method is practiced in a centrifugal delayed resonance damping assembly coupled to a structure subject to varying frequencies of torsional excitation which includes a support and a rotating structure on the support. At least one absorber unit having known mass and damping characteristics and having a pendulum mass is pivotably supported on the rotating structure. Included are means for imparting a control torque to the damping pendulum and means for monitoring the angular displacement of the damping pendulum mass relative to the rotating structure. Also provided are means for determining the frequency of torsional excitation of the rotating structure and delayed feedback control means for processing the monitored displacement together with mass damper characteristics of the absorber unit. The control means generates a signal acting on the means for imparting a control torque to the pendulum mass and this signal is proportional to the angular displacement of the pendulum mass. The control means provides a controlled time delay to produce the control torque in the pendulum mass and this produces resonance of the pendulum mass with the rotating structure which is effective to damp substantially the torsional vibrations of the rotating structure at the frequency. The output signal is variable to produce a control torque acting on the pendulum mass with a delay and which is proportional to the angular displacement of the pendulum mass.

In an easily effected embodiment, the means for imparting a controlled torque is an electric motor with a stator fixed in the rotating structure and a rotor freely movable relative thereto and connected to the pendulum mass.

DETAILED DESCRIPTION OF THE PREFERRED EMBODIMENT

Figure 1:
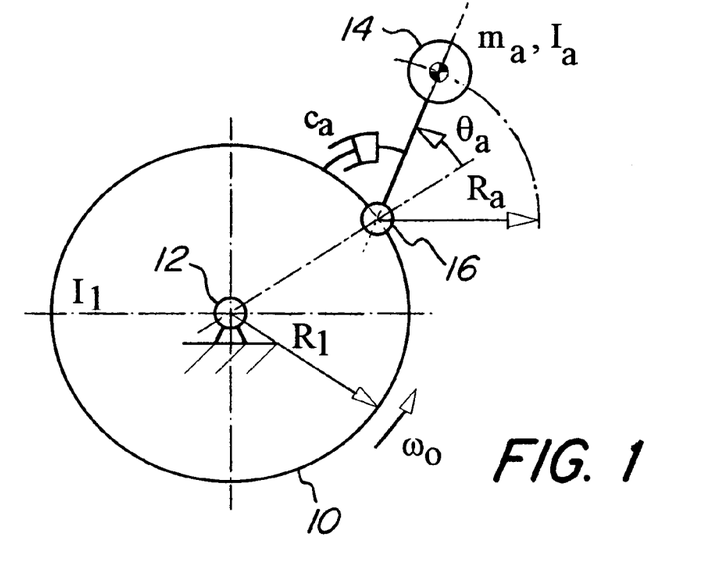
FIG. 1 is a diagrammatic illustration of the various forces in a rotating structure with a conventional damped centrifugal pendulum.

Basically, the absorber of the present invention reconfigures the dynamics of a damped centrifugal pendulum device seen in FIG. 1 so that it behaves like an ideal tunable resonator which will dynamically respond to the monitored frequency of excitation on the rotating large mass structure. The present invention relies upon the application of a proportional feedback based upon the angular displacement of a damping pendulum relative to the large mass in response to excitation based upon the frequency of torsional vibration induced in the rotating structure. The dynamically monitored data on the displacement of the pendulum is processed in a computer together with data concerning the mass and damping characteristics of the pendulum in accordance with the principles described hereinafter to produce the desired control torque to be applied between the rotating mass and the pendulum. This controlled torque is proportional to the angular displacement of the damping member and is applied with a controlled time delay so as to produce an amplitude of oscillations of the damping member which counteracts the vibration of the rotating mass. This results in resonance of the damping member at the frequency of excitation of the rotating structure.

The intuitive rationale behind inducing such a resonance amplitude is straightforward. The delayed resonator may be considered as a substructure of a larger system which is harmonically excited. If the frequency of excitation is equal to the natural frequency of the centrifugal delayed resonator (CDR), then the latter resonates with a 180° phase shift with respect to the excitation frequency and absorbs all of the energy which is introduced to the system.

As a result of the dynamically controlled delayed feedback and-resulting resonance, the damping member will effectively damp the vibrations in the primary structure.

The basic theory of a delayed resonator for dynamically damping vibrations of a translational nature in a monitored structure is set forth in Olgac U.S. Pat. No. 5,431,261 and in the aforementioned article of N. Olgac and B. Holm-Hansen.

Figure 2:
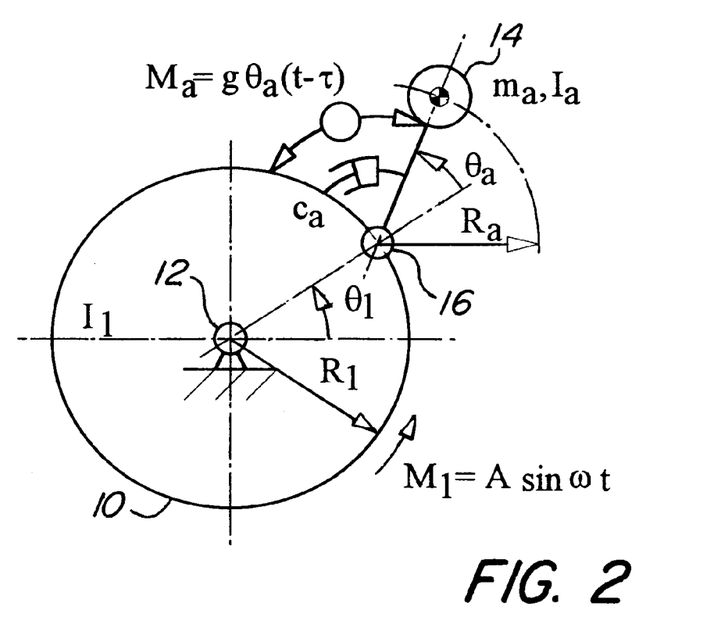
FIG. 2 is a similar illustration of the forces in a rotating structure with a centrifugal delayed resonator embodying the present invention.

As shown in FIG. 2, to achieve this goal, there is introduced into the pendulum the excitation torque $M_a$ which is based on a proportional position feedback with time delay. In these illustrations $n_a=1$ and $\omega_o$=constant. In these illustrations a structure 10 of large mass is rotating on a shaft 12 and has the radius $R_1$ and a nominal angular velocity of $\omega_o$. A damping resonator 14 of relatively small mass is pivotably supported at the pivot 16 on the structure 10 and rotates relative thereto at a radial spacing $R_a$ with an inertial moment $I_a$ about its center of mass. Its angular deviation from a radial position is represented by $\theta_a$ and its damping coefficient is represented by $C_a$.

For small relative displacements of the absorber pendulum, the new system dynamics is governed by the following linearized differential equation of motion:

$$(I_a+m_aR_a^2)\ddot{\theta}_a(t)+c_a\dot{\theta}_a(t)+m_aR_1R_2\omega_o^2\theta_a(t)+g\omega_a(t-\tau)=0 \quad (1)$$

DERIVATION OF THE EQUATION

Figure 4A:
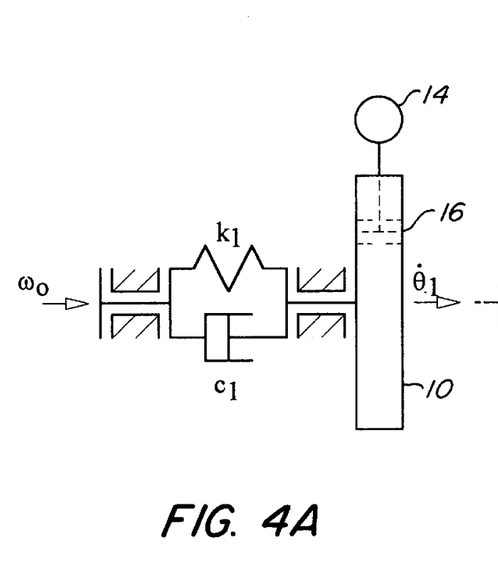
FIGS. 4a and 4b are schematic and diagrammatic illustrations of a rotating structure damped by a single centrifugal delayed resonator embodying the present invention.
Figure 4B:
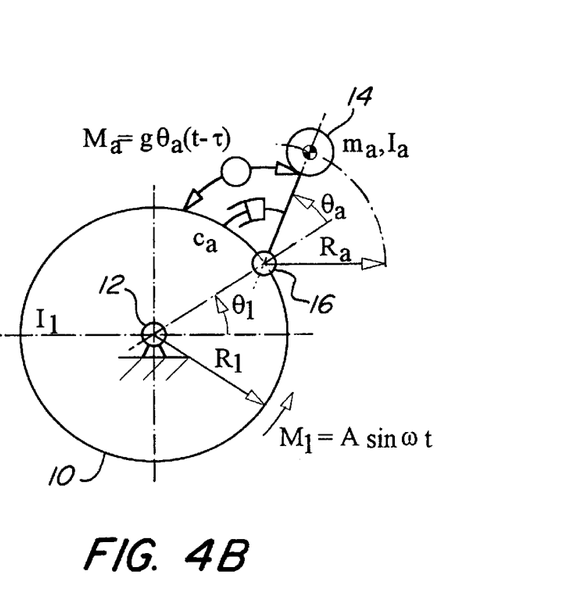

The mechanical structure under consideration is a combined system of the type as shown in FIG. 4.

A "combined system" as used herein is a primary structure equipped with one or more absorber units. An absorber unit is a single centrifugal delayed resonator assembly.

Nomenclature and Units of Measurement

The following is a glossary of the terms in the equations herein and the units of measurement:

A Amplitude of the disturbing torque acting on the primary structure (Nm)
$c_a$ Damping coefficient of the absorber unit (kgm²/s)
$c_1$ Damping coefficient of the primary structure (kgm²/s)
$E_a$ Kinetic energy of the absorber unit (J)
$E_1$ Kinetic energy of the primary structure (J)
g Control feedback gain (Nm)
$I_a$ Inertia moment of the absorber unit about its center of mass (kgm²)
$I_1$ Inertia moment of the primary structure about the center of rotation (kgm²)
$k_1$ Stiffness coefficient of the primary structure (kgm²/S²)
L Lagrangian function (J)
$m_a$ Mass of the absorber unit (kg)
n Order of disturbance (-)
$n_a$ Number of absorber units attached to the primary structure (-)
$R_a$ Distance between the point of suspension of the absorber unit and the center of mass of the absorber unit (m)
$R_1$ Distance between the center of rotation of the primary structure and the point of suspension of the absorber unit (m)
$M_1$ Disturbing torque acting on the primary structure (Nm)
$M_a$ Control torque acting on the absorber unit (Nm)
$V_a$ Translational velocity of the center of mass of the absorber unit (m/s)
$\Delta_1$ Angular displacement of the primary structure relative to the rotating base (rad)
$\zeta_a$ Damping ratio of the absorber unit (-)
$\theta_a$ Angular displacement of the absorber unit relative to the primary structure (rad)
$\theta_1$ Angular displacement of the primary structure relative to the fixed frame of reference (rad)
$\tau$ Control feedback delay (s)
$\omega$ Frequency of the disturbing torque acting on the primary structure (rad/s)
$\omega_a$ Natural frequency of the passive absorber unit (rad/s)
$\omega_c$ Resonance frequency of the Centrifugal Delayed Resonator (rad/s)
$\omega_o$ Angular velocity of the rotating base (rad/s)

The base 10 rotating with the constant angular velocity $\omega_o$ carries the SDOF (single degree of freedom) primary structure 12 (with parameters $R_1$, $I_1$, $c_1$ and $k_1$) upon which the disturbing torque $M_1$ acts. The primary structure is equipped with $n_a$ absorber units (with parameters $R_a$, $I_a$, $m_a$ and $c_a$), each of which is controlled by the torque $M_a$ based on the proportional position feedback with time delay.

Assuming that the influence of gravity forces is negligible, the Lagrangian function has the form:

$$L=\tfrac{1}{2}\{I\dot{\theta}_1^2+n_aI_a(\dot{\theta}_1+\dot{\theta}_a)^2+n_am_a[R_1^2\dot{\theta}_1^2+R_a^2(\dot{\theta}_1+\dot{\theta}_a)^2 2R_1R_a(\dot{\theta}_1^2+\dot{\theta}_1\dot{\theta}_a)\cos\theta_a]\} \quad (2)$$

Taking the angular displacements $\theta_1$ and $\theta_a$ as generalized coordinates, the corresponding generalized forces are:

$$Q_1=-C_1(\dot{\theta}_1-\omega_o)-K_1(\theta_1-\omega_o t)+n_ac_a\dot{\theta}_a+n_ag\theta_a(t-\tau)+M_1 \quad (3)$$

$$Q_a=-n_ac_a\dot{\theta}_a-n_ag\theta_a(t-\tau) \quad (4)$$

With this information, the Lagrange equations of motion for the combined system can be written as:

$$Q_1 = \frac{d}{dt}\left(\frac{\partial L}{\partial \dot{\theta}_1}\right)-\frac{\partial L}{\partial \theta_1} \quad (5)$$

$$Q_a = \frac{d}{dt}\left(\frac{\partial L}{\partial \dot{\theta}_a}\right)-\frac{\partial L}{\partial \theta_a} \quad (6)$$

Differentiating L and introducing the relative displacement of the primary structure $\Delta_1=\theta_1-\omega_o t$ yields the following system of simultaneous nonlinear differential equations of motion:

$$[I_1+n_aI_a+n_am_a(R_1^2+R_a^2+2R_1R_a\cos\theta_a)]\ddot{\Delta}_1+[n_aI_a+n_am_a(R_a^2+R_1R_a\cos\theta_a)]\ddot{\theta}_a==$$

$$n_am_aR_1R_a[2(\omega_o+\dot{\Delta}_1)\dot{\theta}_a+\dot{\theta}_a^2]\sin\theta_a-C_1\dot{\Delta}_1-K_1\Delta_1+n_ac_a\dot{\theta}_a+n_ag\theta_a(t-\tau)+M_1 \quad (7)$$

$$[I_am_a(R_a^2+R_1R_a\cos\theta_a)]\ddot{\Delta}_1+(I_a+m_aR_a^2)\ddot{\theta}_a==-m_aR_1R_a(\omega_o+\dot{\Delta})^2\sin\theta_a-c_a\dot{\theta}_a-g\theta_a(t-\tau) \quad (8)$$

Assuming small angular displacements, the nonlinear equations of motion can be linearized in the neighborhood of the point of stable equilibrium (i.e. $M_1=0, \Delta_1=\dot{\Delta}_1=\ddot{\Delta}_1=0, \theta_a=\dot{\theta}_a=\ddot{\theta}_a=0$)

As a favorable result, the theory of linear systems can be used to study the dynamic properties of the combined system and its components.

Combined System

Denoting the left-hand sides in Equations 7 and 8 by $f_1$ and $f_a$, respectively, the equations of motion can be linearized in the neighborhood of the point of equilibrium as:

$$[\partial f_1/\partial \Delta_1]_o A_1 + [\partial f_1/\partial \dot\Delta_1]_o \dot A_1 + [\partial f_1/\partial \ddot\Delta_1]_o \ddot A_1 [\partial f_1/\partial \theta_a]_o \theta_a + + [\partial f_1/\partial \dot\theta_a]_o \dot\theta$$

$$_a + [\partial f_1/\partial \ddot\theta_a]_o \ddot\theta_a + [\partial f_1/\partial \theta_a(t-\tau)]_o \theta_a(t-\tau) + [\partial f_1/\partial M_1]_o M_1 = 0 \tag{9}$$

$$[\partial f_a/\partial \Delta_1]_o A_1 + [\partial f_a/\partial \dot\Delta_1]_o \dot A_1 + [\partial$$

$$f_a/\partial \theta_a]_o \theta_a + + [\partial f_a/\partial \dot\theta_a]_o \dot\theta_a + [\partial f_a/\partial \ddot\theta$$

$$_a]_o \ddot\theta_a + [\partial f_a/\partial \theta_a(t-\tau)]_o \theta_a(t-\tau) = 0 \tag{10}$$

Evaluating the partial derivatives involved yields the following system of simultaneous transcendental differential equations of motion for the combined system:

$$[I_1 + n_a I_a + n_a m_a(R_a + R_1 + R_a)^2]\ddot A_1 + C_1 \dot\Delta$$

$$_1 + K_1 \Delta_1 + + [n_a I_a + n_a m_a(R_a^2 + R_1 R_a)]\ddot\theta_a - n_a c_a \dot\theta_a - n_a g \theta_a(t-\tau) - m_1 0 \tag{11}$$

$$[I_a + m_a(R_a^2 + R_1 R_a)]\ddot A_1 + (I_a + m_a R_a^2)\ddot\theta_a + c_a \dot\theta_a + m_a R_1 R_a \omega_o^2 \theta_a + g\theta_a(t-\tau) = 0 \tag{12}$$

Centrifugal Delayed Resonator

To study the dynamics of the Centrifugal Delayed Resonator (CDR) alone, the primary structure is assumed to be rigidly connected to the rotation base, i.e., $$\Delta_1 = \dot\Delta_1 = \ddot\Delta_1 = 0.$$

With this proposition, Equation 12 takes the form:

$$(I_a + m_a R_a^2)\ddot\theta_a + c_a \dot\theta_a + m_a R_1 R_a \omega_o^2 \theta_a + g\theta_a(t-\tau) = 0 \tag{13}$$

Uncontrolled Absorber Unit

At the stage of the CDR design (i.e., proper selection of the structural parameters $R_a$, $I_a$, $m_a$ and $c_a$), the dynamics of the uncontrolled absorber unit should be analyzed. Replacing $g\theta_a(t-\tau)$ by $M_a$ in Equation 13 yields the equation of motion for forced oscillations of the damped centrifugal pendulum absorber alone:

$$(I_a + m_a R_a^2)\ddot\theta_a + c_a \dot\theta_a + m_a R_1 R_a \omega_o^2 \theta_a = M_a \tag{14}$$

The relationships between the structural parameters and the corresponding natural frequency and damping ratio become:

$$\omega_a = \sqrt{\frac{R_1}{R_a + I_a/(m_a R_a)}} \omega_0 \tag{15}$$

$$\zeta_a = \frac{c_a}{2\omega_o \sqrt{m_a R_1 R_a(I_a + M_a R_a^2)}} \tag{16}$$

The resonant peak of the frequency response of the uncontrolled absorber occurs at the following frequency of excitation for light damping:

$$\omega_p = \omega_a \sqrt{1 - 2\zeta_a^2} \approx \omega_a \tag{17}$$

Returning now to the linearized equation of motion (Equation 1), the theory of the present invention may be explored.

The corresponding Laplace domain representation leads to the following transcendental characteristic equation:

$$c(s) = (I_a + m_a R_a^2)s^2 + c_a s + m_a R_1 R_a \omega_o^2 + g e^{-\tau s} 0 \tag{18}$$

This equation possesses infinitely many roots. To achieve the pure resonator behavior, two dominant roots of Equation 18 should be placed on the imaginary axis at the desired resonant frequency while other roots remain in the stable left-half plane. The proposition $s = \pm \omega_c i$ as the solution of Equation 18 yields the control parameters of:

$$g_c = \sqrt{(c_a \omega_c)^2 + [(I_a + m_a R_a^2)\omega_c^2 - m_a R_1 R_a \omega_0^2]^2} \tag{19}$$

$$\tau_c = \frac{\mathrm{atan2}[c_a \omega_c, (I_a + m_a R_a^2)\omega_c^2 - m_a R_1 R_a \omega_o^2] + 2(l-1)\pi}{\omega_c}, \tag{20}$$

$$l = 1, 2, 3 \ldots$$

These control parameters can be adjusted according to Equations 19 and 20 to tune the CDR to the desired resonant frequency $\omega_c$ in real time. A similar solution can be carried out also for negative values of the feedback gain $g_c$. However, for the sake of simplicity, this is not addressed.

Figure 3A:
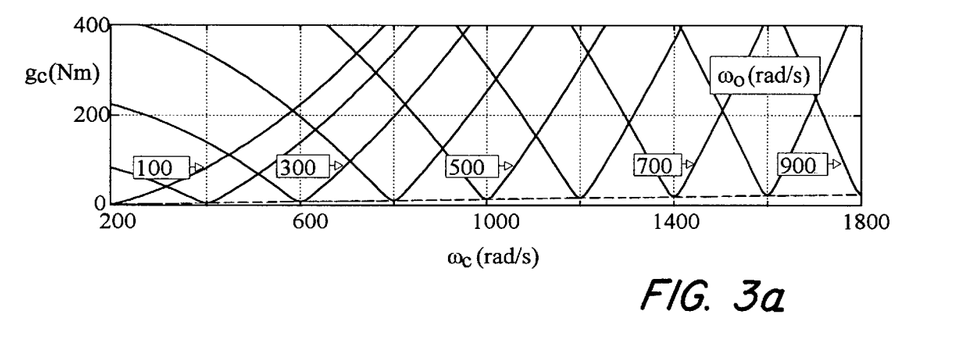
FIG. 3a is a graphic illustration of the feedback gain in accordance with the present invention.
Figure 3B:
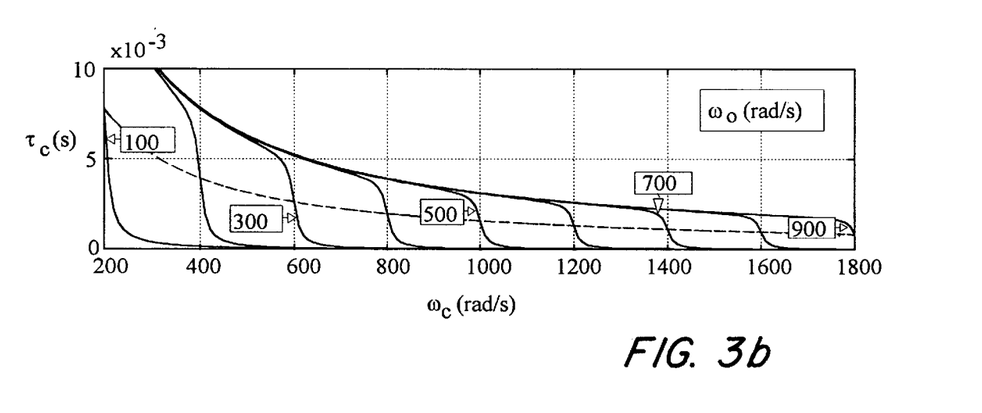
FIG. 3b is a graphic illustration of the time delay in accordance with the present invention.

Typical plots of the control parameters versus the resonant frequency are shown in FIGS. 3$a$ and 3$b$. The structural parameters $R_a, I_a, m_a$, and ca are selected in such a way that the natural frequency (and thus, approximately, the frequency of the resonant peak) of the lightly damped passive centrifugal pendulum assembly is twice the angular velocity of the rotating base, i.e., $\omega_a 2 \omega_o$. Solid curves represent graphs of $g_c(\omega_c)$ and $\tau_c(\omega_c)$ for different values of the angular velocity $\omega_o$ in rad/s. Dashed curves indicate a double order of resonance (the order of resonance is defined as the ratio of the resonant frequency of the CDR and the angular velocity of the rotating base, i.e. $n = \omega_c/\omega_o$)

Compared to the conventional delayed resonator of Olgac et al. referred to previously which is based on the conventional mass-spring-damper setting, the CDR offers considerably relaxed limits of operating frequencies. This may be seen in FIG. 3 where the CDR can be represented by an equivalent angular velocity $\omega_o$, e.g., 500 rad/s, for the natural frequency of 1,000 rad/s. It is observed that the feedback gain $g_c$ rapidly increases and the sensitivity of the time delay $\tau_c$ considerably decreases when the resonant frequency $\omega_c$ departs from the neighborhood of the natural frequency of the mass-spring-damper setting used.

On the other hand, the CDR operates in the zone where the minimum values of the feedback gain $g_c$ and the maximum sensitivity of the time delay $\tau_c$ are found. So long as the frequency xc fluctuates at about the given order of resonance (which is taken as n=2 for this analysis), these features hold and provide strong advantages for the CDR as a tuned dynamic absorber.

THE CENTRIFUGAL DELAYED RESONATOR AS A VIBRATION ABSORBER

Attached to the primary structure which is disturbed by a harmonic load, the properly tuned CDR can act as an ideal torsional vibration absorber. The resulting combined system of the single degree-of-freedom (SDOF) primary structure equipped with the CDR is depicted in FIG. 4. For small displacements, its dynamics are governed by the following linearized system of simultaneous differential equations:

$$[I_a + m_a(R_a^2 + R_1 R_a)]\ddot\Delta_1(t) + +(I_a + m_a R_a^2)\ddot\theta_a(t) + c_a \dot\theta_a(t) + m_a R_1 R_a \omega_o^2 \theta_a(t) + g\theta_a(t-\tau) = 0 \tag{21}$$

$$[I_1 + n_a I_a + n_a m_a(R_1 + R_a)^2]\ddot\Delta_1(t) + C_1 \dot\Delta_1(t) + K_1 \Delta_1(t) + + [n_a I_a + n_a m_a(R_a^2 + R_1 R_a)]$$

$$\ddot\theta_a(t) - n_a c_a \dot\theta_a(t) - n_a g \theta_a(t-\tau) - M_1(t) = 0 \tag{22}$$

The corresponding Laplace domain representation leads to the following solution for the relative displacement of the primary structure:

$$\Delta_1 = \frac{C(s)}{A(s) + B(s)ge^{-\tau s}} M(s) \quad (23)$$

The expressions A(s) and B(s) in the denominator are known polynomials of the 4th and 2nd order, respectively. The numerator C(s) is identical to the characteristic expression in Equation 18. Therefore, so long as the denominator possesses stable roots and the CDR is tuned to the frequency of disturbance (i.e. $\omega=\omega_c$, $g=g_c$, $\omega=\tau_c$), the primary structure exhibits no oscillatory motion in the steady state:

$$\Delta_1(t)=0 \quad (24)$$

Due to linearity of the combined system, the frequency of excitation can be detected by observing the motion of the absorber unit relative to the primary structure as shown schematically in FIG. 4 in which $n_a=1$ and $\omega_o$=constant. Since the control parameters are functions of the absorber structural parameters and the angular velocity of the rotating base only (see Equations 19, 20), the CDR control system is entirely decoupled from the structural and dynamic parameters of the primary system.

The pendulum will oscillate at substantially the same frequency as the rotating mass to which it is coupled although at a different amplitude. The sensor determines the angular deviation of the pendulum mass, and the control system determines the torque to be applied to the pendulum mass to provide the desired resonance characteristics to the absorber.

The control torque is effectively applied by an actuator, e.g., an electric motor in which the stator is fixed in the rotating structure and in which the rotor can rotate freely relative to the stator. The axis of rotation of the motor is parallel to the axis of rotation of the rotating structure. Operation of the motor will produce a control torque on the pendulum mass through the arms 31 to create the desired resonance characteristics.

Figure 5:
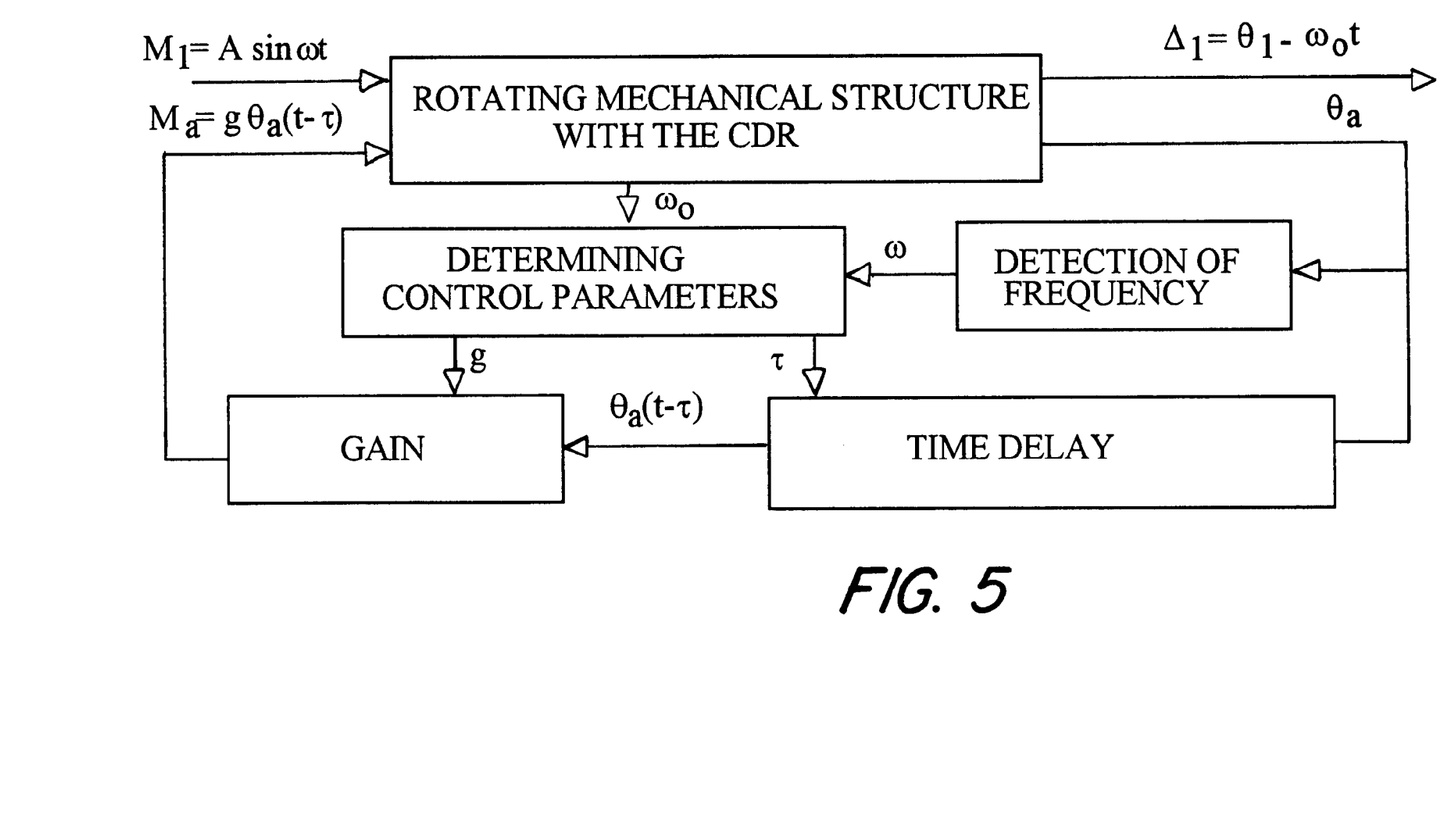
FIG. 5 is a block diagram of the control system for the centrifugal delayed resonator of FIG. 4.

The control system for the CDR is illustrated diagrammatically in FIG. 5. The angular displacement of the pendulum mass is monitored. A computer processes this observation together with information concerning mass damper characteristics, etc., in accordance with Equations 19 and 20 to determine the output signal to impart a control torque to the pendulum mass.

Figure 6:
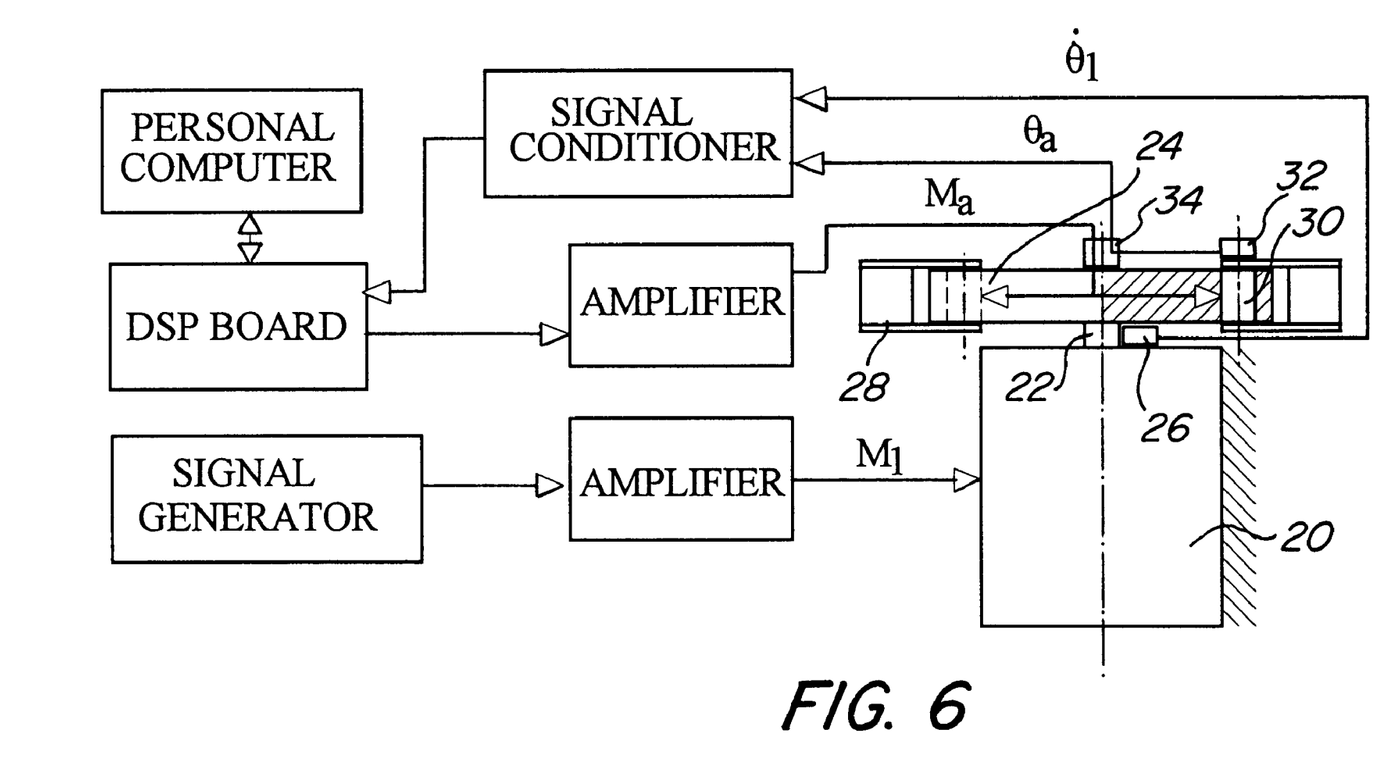
FIG. 6 is a diagrammatic illustration of an experimental centrifugal delayed resonator (CDR) damping system.

Turning next to FIG. 6, therein illustrated is an experimental setup for a CDR system. The motor 20 has a shaft 22 upon which is mounted the rotating structure 24. A sensor 26 is provided to determine the angular velocity of the structure 24. Pivotably coupled to the structure 24 is a pair of CDR units comprising a mass 28, a torsional actuator 30 and shafts 31 which are fixed to the mass 28 and the rotor of the actuator 30. A sensor 32 determines the angular displacement of the mass 28. The sensor 32 and actuator 30 are coupled to the control unit through the slip rings 34.

The signals from the sensors 26 and 32 are conditioned and input into the computer which then determines the output signal which is amplified and transmitted through the slip rings 34 to the torsional actuator 30.

Figure 7:
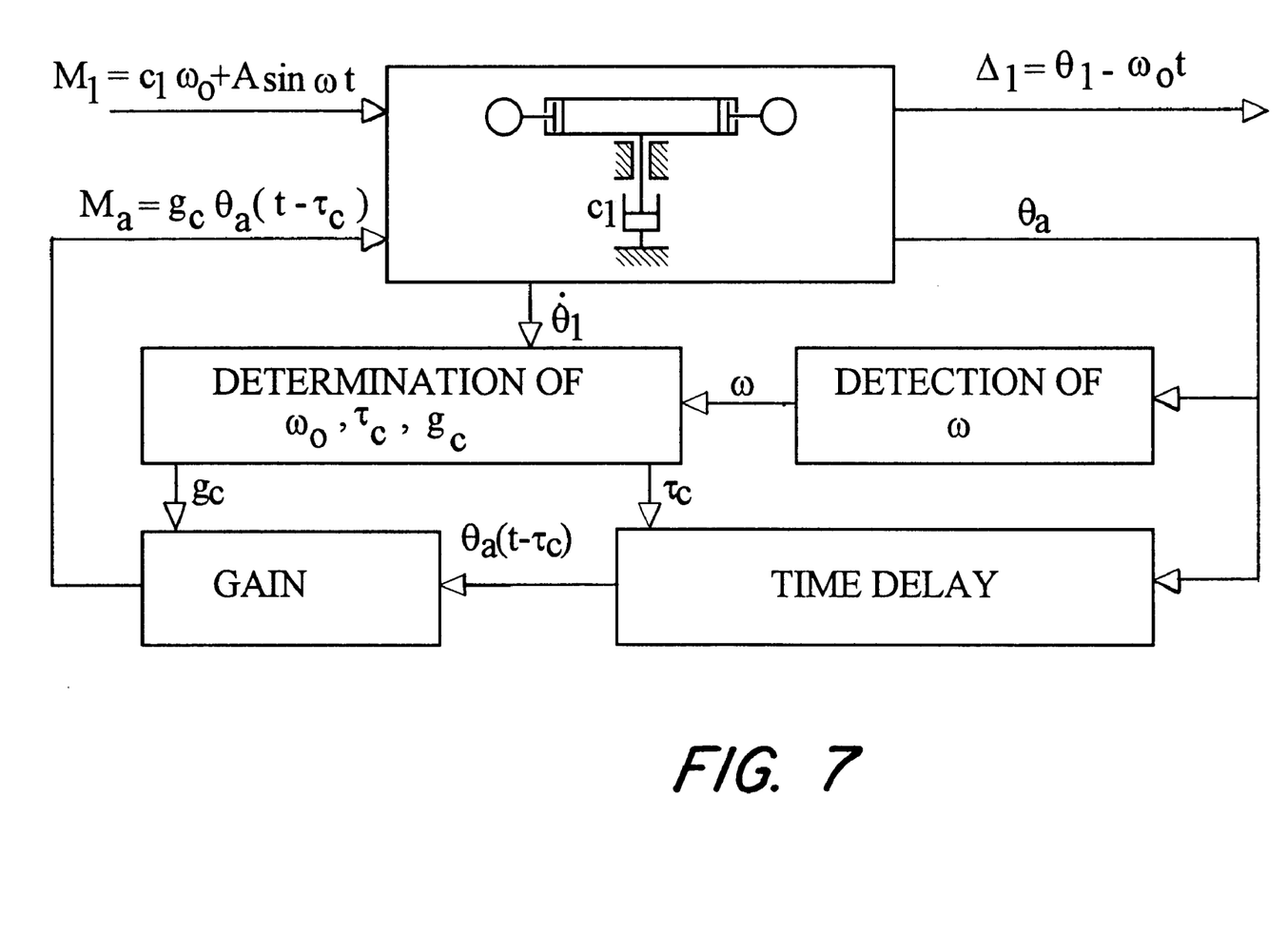
FIG. 7 is a block diagram of the control system for the damping system of FIG. 6.

FIG. 7 is a block diagram of the control system for the CDR of FIG. 6 to impart the desired control torque to the damping mass.

In this manner, the properly tuned CDR completely removes undesired vibrations from the rotating primary structure caused by a harmonic force disturbance. This property can be analytically proven valid for the multi-degree-of-freedom (MDOF) primary structure as an extension.

SIMULATION OF TIME RESPONSE FOR A COMBINED SYSTEM

To illustrate the manner in which the centrifugal delayed resonator operates, a computer simulation may be conducted.

The primary structure is taken as a cylindrical body with a mass of 10 kg, a radius of 0.15 m, a natural frequency of 1,000 rad/s and a damping ratio of 0.1 which leads to the structural parameters $I_1=1.125\times10^{-1}$ kgm$^2$, $c_1=22.5$ kgm$^2$/s, $k_1=1.125\times10^5$ kgm$^2$/s$^2$ and $R_1=0.15$ m. The frequency of disturbance is expected to fluctuate within a certain interval around the order of resonance n=2. Therefore, the CDR assembly is designed so that the resonant peak of the uncontrolled absorber matches $2\omega_o$. If the damping ratio of the absorber unit is taken as 0.01, the corresponding structural parameters are $I_a=2\times10^{-7}$ ktm$^2$, $m_a=0.5$ kg, $c_a=2.812\times10^{-5}$ kgm$^2$/s and $R_a=3.74\times10^{-2}$ m. The number of the absorber units attached to the primary structure is selected as $n_a=2$.

Figure 9A:
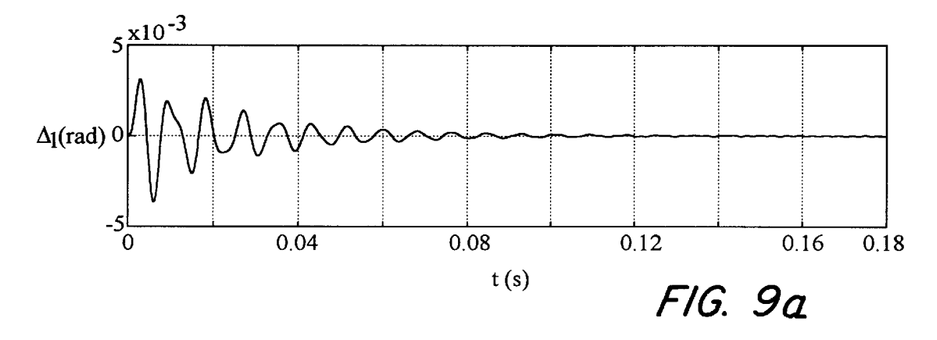
FIG. 9a is a graphic representation of the simulated time response of the combined system and the angular displacement of the rotating mass relative to the rotating base.
Figure 9B:
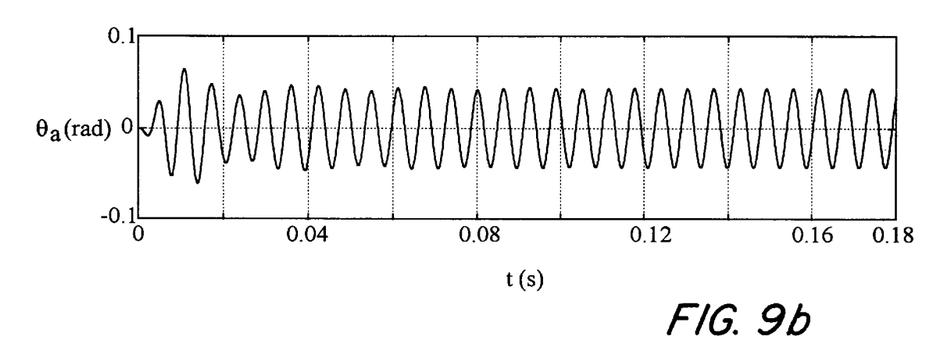
FIG. 9b is a graphic representation of the simulated time response of the combined system and the angular displacement of the pendulum relative to the rotating structure.

The sample time response simulation using the nonlinear model of the combined system is presented in FIGS. 9a and 9b. The primary structure is disturbed from rotation with the constant angular velocity $\omega_o=500$ rad/s by the torque $M_1=A$ sin $\omega t$, where A=300 Nm and $\omega=1000$ rads. It can be observed that, after approximately 0.12 seconds of transient response, all undesired oscillations are practically removed from the primary structure.

Although the foregoing illustrations show only a single resonator, it will be appreciated that multiple resonators may be employed. If two are employed, they should be of equal characteristics and be diametrically spaced; if three or more are employed, they should be equidistantly spaced about the large mass structure and of the same mass.

Various devices may be used to monitor the angular displacement of the damping member such as rotational potentiometers and rotational variable differential transformers.

The torque imposed on the damping member may be effected by a controlled motor, a torsional piezoelectric actuator, or a limited displacement electromagnetic actuator.

The computer or microprocessor stores data concerning the mass, stiffness and damping characteristics of the damping member, and the algorithms selected for the particular assembly as described hereinbefore. Inputs from the displacement monitor for the damping member are received and processed to output the signals to the torsional actuator for the damping member.

Figure 8A:
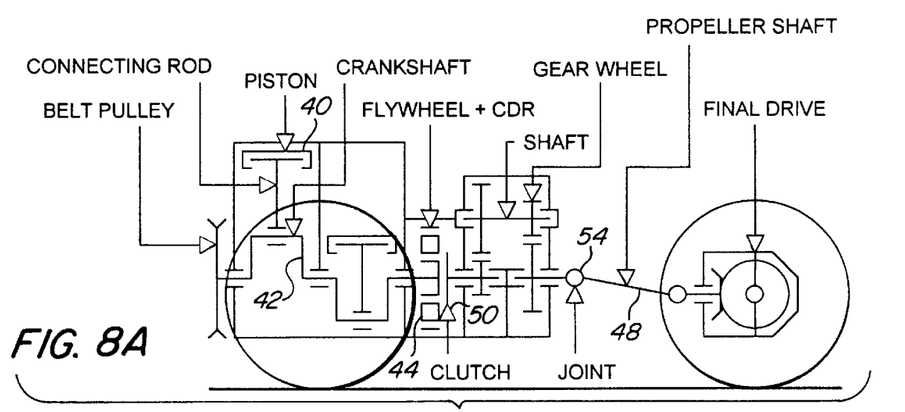
FIG. 8a and 8b are schematic and diagrammatic illustrations of an engine transmission system incorporating a centrifugal delayed resonator in accordance with the present invention.
Figure 8B:
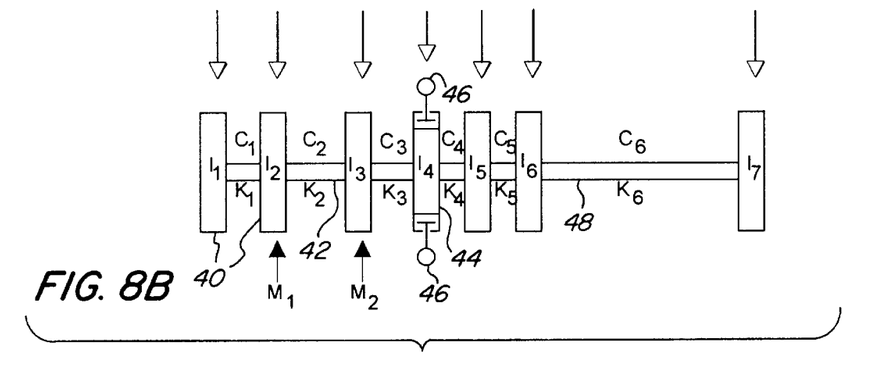

FIG. 8 diagrammatically illustrates the application of the CDR of the present invention to an engine transmission. Two piston/cylinders 40 of a motor act upon the crankshaft 42 to impart rotary motion thereto. On the output end of the crankshaft 42 is a flywheel 44 upon which are pivotably mounted a pair of CDR units 46. The rotary drive motion of the crankshaft 42 is transmitted to the propeller shaft 48 through a clutch 50, drive shaft 52 and coupling 54. By damping the vibrations of the flywheel 44, the transmission of torsional vibrations to the gear box in the system may be effectively eliminated.

Figure 10A:
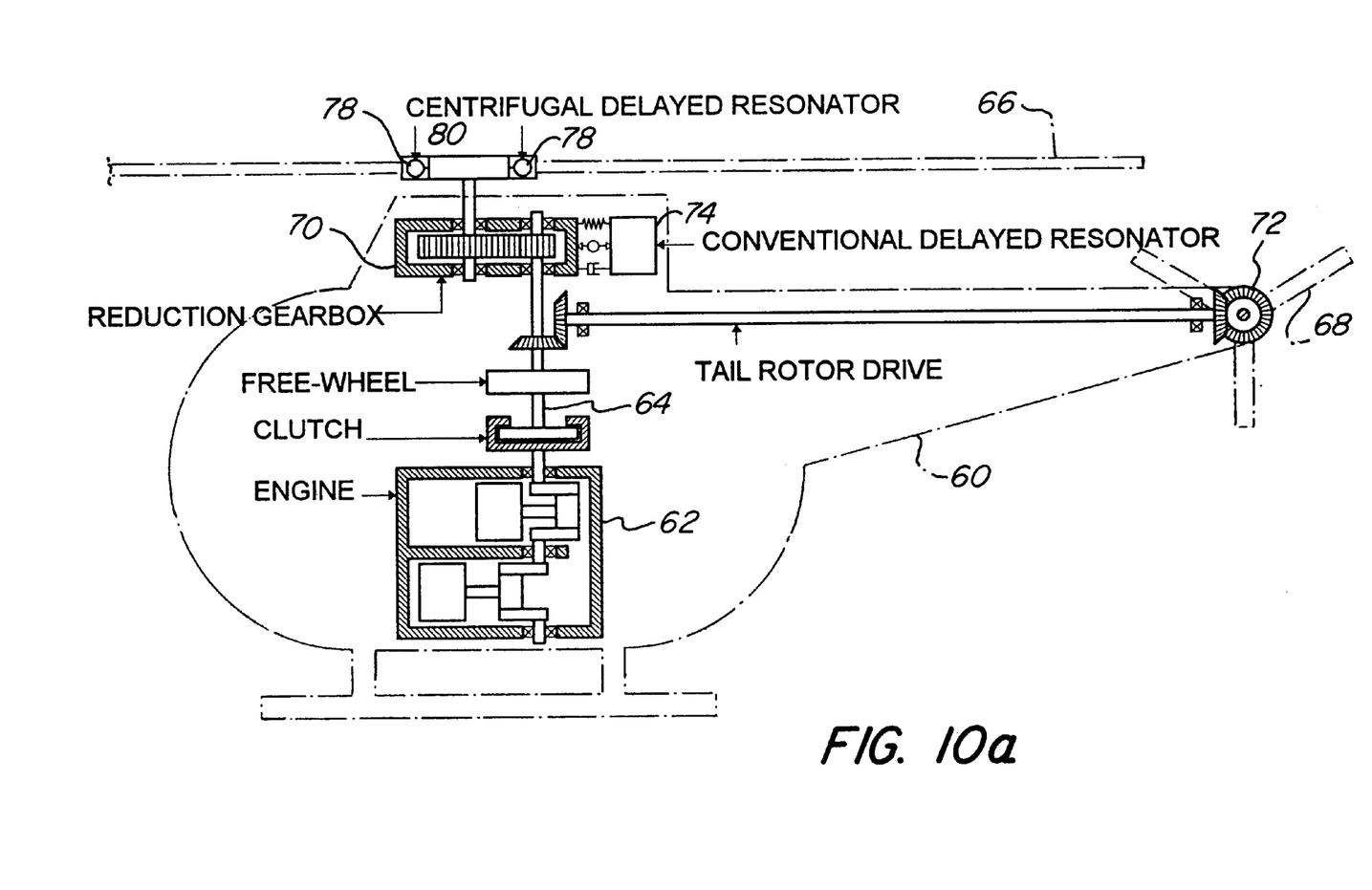
FIGS. 10a and 10b are schematic and diagrammatic representations of a helicopter equipped with both the centrifugal delayed resonator for damping torsional vibrations in the rotor and a conventional delayed resonator for damping translational vibrations in the gear box.
Figure 10B:
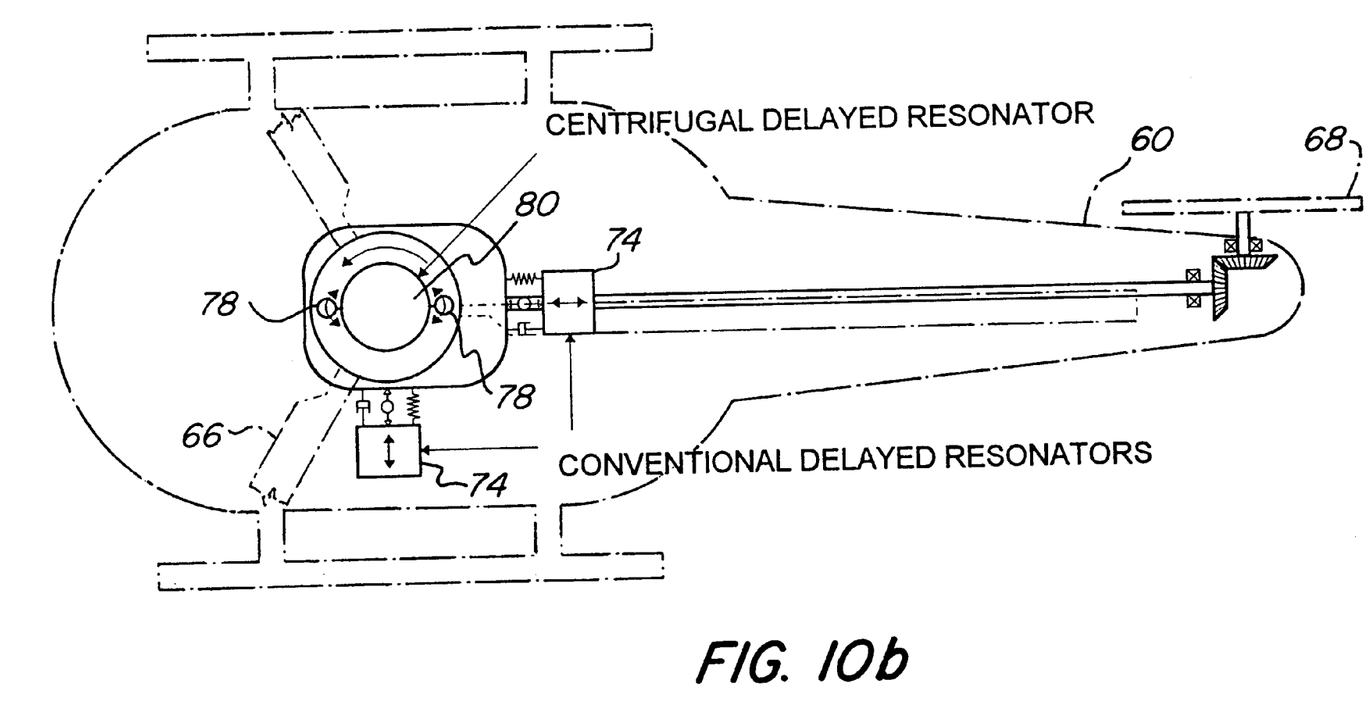

Turning lastly to FIG. 10, therein is illustrated an installation of the Centrifugal Delayed Resonator (CDR) of the present invention as well as the prior conventional delayed resonator. A helicopter 60 shown in dotted line has a diagrammatically illustrated engine 62 with a drive shaft 64 which imparts rotation to the rotor 66 and to the rotor 68 through the diagrammatically illustrated transmission systems 70, 72, respectively.

As is well known, the engine 62 will produce translational vibrations and these may be damped by the conventional delayed resonators 74 and 76 of Olgac previously described. The torsional vibrations of the rotor 66 are damped by coupling a Centrifugal Delayed Resonator (CDR) 78 of the present invention to its hub 80.

By this combined delayed resonator assembly, the vibrations generated by the engine 62 and the main rotor 66 can be efficiently damped. An additional CDR system may also be provided on the hub of the rotor 68.

As will be readily appreciated, the Centrifugal Delayed Resonator of the present invention is a dynamically tunable device for active suppression of torsional vibrations in rotating mechanical structures. It is superior to vibration control techniques currently used in practice because, in the steady state, the CDR is capable of completely eliminating undesired oscillations of the primary structure loaded by a harmonic disturbance.

Due to its real-time tuning, the CDR is fully effective for vibration problems with a time-varying harmonic disturbance. It can function with a very wide frequency range, especially in cases where the frequency of disturbance tends to increase with the angular velocity of the primary structure.

The control system is decoupled from the structural and dynamic properties of the primary structure to which the CDR is attached, and the control algorithm for the CDR is very simple to implement. Moreover, due to its hybrid (i.e., active-passive) character, the CDR can be partially effective even in the case of control failure, assuming that the passive centrifugal pendulum absorber used is tuned properly.

Thus, it can be seen from the foregoing detailed description and attached drawings that the centrifugal delayed resonator of the present invention can dynamically damp torsional vibrations of varying frequency which are being imposed upon the rotating structure. Using the principles set forth herein and readily observed data concerning the frequency of vibration in the rotating structure and angular displacement of the pendulum mass, a centrifugal delayed resonator functioning as an absorber can be readily designed and fabricated. Moreover, the simplicity of the structure enables facile assembly and operation as well as relatively long life.

Having thus described the invention, what is claimed is:

1. In a method for damping torsional vibrations in a rotating structure having a relatively large mass and subject to varying frequencies of torsional excitation, the steps comprising:
   (a) determining the frequency of torsional excitation of a rotating structure of relatively large mass in which the vibrations caused by said frequency are to be damped;
   (b) coupling to said rotating structure a damping pendulum of smaller mass to provide an absorber unit rotating with said rotating structure;
   (c) determining the mass damper characteristics for said absorber at said determined frequency of excitation;
   (d) continuously monitoring the angular displacement of said damping pendulum relative to said rotating structure;
   (e) processing said monitored displacement of said damping pendulum together with said mass damper characteristics of said absorber unit; and
   (f) outputting a signal to produce a control torque on said damping pendulum proportional to the monitored displacement of said damping pendulum with a controlled time delay to produce control torque on said damping pendulum substantially equal to torsional excitation of said rotating structure and thereby to produce resonance of said damping pendulum substantially at said torsional excitation of said rotating structure, said resonance being effective to damp substantially the vibrations of said rotating structure, said output signal being variable to produce a control torque on said damping pendulum with a delay and which is proportional to said displacement of said damping pendulum.

2. The method of damping torsional vibrations in a rotating structure in accordance with claim 1 wherein said step of outputting a signal effects the rotation of a torque actuator in said absorber unit to produce a control torque on its pendulum mass.

3. The method of damping torsional vibrations in a rotating structure in accordance with claim 1 wherein at least two absorber units are coupled to said rotating structure and receive torsional excitation to cooperatively damp said torsional vibrations in said rotating structure.

4. The method of damping torsional vibrations in a rotating structure in accordance with claim 1 wherein the processing step utilizes the following formula to obtain the output signal:

$$g\theta_a(t-\tau)$$

wherein g is gain, $\theta_a$ is the monitored displacement and $\tau$ is the feed back delay.

5. The method of damping torsional vibrations in a rotating structure in accordance with claim 4 wherein the feedback delay ($\tau$) and gain (g) are determined as follows:

$$g_c = \sqrt{(c_a\omega_c)^2 + [(I_a + m_a R_a^2)\omega_c^2 - m_a R_1 R_a \omega_0^2]^2}$$

$$\tau_c = \frac{\mathrm{atan2}[c_a\omega_{c'}(I_a + m_a R_a^2)\omega_c^2 - m_a R_1 R_a \omega_o^2] + 2(l-1)\pi}{\omega_c},$$

$$l = 1, 2, 3 \ldots$$

wherein $\tau_c$ is the feedback delay and $g_c$ is the gain for specific values of $w_c$ and $w_o$.

6. A centrifugal delayed resonance damping assembly coupled to a structure subject to varying frequencies of torsional excitation comprising:
   (a) a support;
   (b) a rotating structure on said support;
   (c) at least one of absorber unit having known mass and damping characteristics and having a pendulum mass pivotably supported on said rotating structure;
   (d) means for imparting a control torque to said damping pendulum;
   (e) means for monitoring the angular displacement of said damping pendulum mass relative to said rotating structure;
   (f) means for determining the frequency of torsional excitation of the rotating structure; and
   (g) delayed feedback control means for processing the monitored displacement together with said damping characteristics of said absorber unit, said control means generating a signal acting on said means for imparting a control torque to said pendulum mass, said signal being proportional to the angular displacement of said pendulum mass, said control means providing a controlled time delay to produce said control torque in said pendulum mass and thereby to produce resonance of said pendulum mass with said rotating structure, said resonance being effective to damp substantially the torsional vibrations of the rotating structure at said frequency, said output signal being variable to produce a control torque acting on said pendulum mass with a delay and proportional to said angular displacement of said pendulum mass.

7. The centrifugal delayed resonance damping assembly in accordance with claim 6 wherein said means for imparting a control torque is an electric motor with a stator fixed in said rotating structure and a rotor freely movable relative thereto and connected to said pendulum mass.

* * * * *